UNITED STATES PATENT OFFICE.

CLARENCE H. SIMPSON, OF FRONT ROYAL, VIRGINIA.

FOOD PRODUCT AND PROCESS OF MAKING SAME.

1,389,389.  Specification of Letters Patent.  Patented Aug. 30, 1921.

No Drawing.  Application filed October 28, 1919. Serial No. 333,889.

*To all whom it may concern:*

Be it known that I, CLARENCE H. SIMPSON, a citizen of the United States, residing at Front Royal, in the county of Warren and State of Virginia, have invented a new and useful Food Product and Process of Making the Same, as set forth in the following specification.

This invention relates to foods and ingredients of foods, and more specifically to an improved food product to constitute the base or main ingredient of fruit-pies, jams, etc. The fundamental idea of this invention involves the use of the pulp or residue of cooked fruit after the juice has been expressed, and here it is desirable to make clear the important difference between this specific pulp and that produced from uncooked fruits, especially apples: Where the apples, for instance, are first cooked, and thereafter have the juice expressed, the pectin and native fruit flavor is expressed with the juice, and the residue is a flavorless mass of fruit-pulp; whereas, if the juice of the raw fruit is expressed, the residual pulp retains a large portion of the pectin and native fruit flavor, and if this raw pulp or residue is afterward cooked it has a flavor peculiar to its class or kind of fruit, which flavor can not be destroyed or successfully overcome by the addition of other fruit-flavors: all efforts of the sort resulting in the excessive and expensive use of fruit flavors, as well as the imperfect production of the desired fruit flavor in the finished food product. On the other hand, by adding a comparatively small quantity of blackberry flavor (for instance) to a mass of the tasteless pulp produced by my method, the resultant food product is a pure, perfectly flavored fruit product having the delicious flavor of the blackberry, but devoid of the annoying blackberry seeds. In the same general class with the blackberry are the dewberry, raspberry, strawberry, huckleberry, gooseberry, currant and grape, all of which have popular flavors, but are objectionable as food products because of their numerous seeds and the comparative scarcity of meat or pulp. Although the apple is not entirely devoid of small seeds, they are less numerous and much larger than the seeds of the above enumerated fruits, and are more easily separated from the meat or pulp. Therefore, the apple is relied on as the main source from which the tasteless or flavorless pulp is obtained, being not only relatively plentiful and cheap, but being also generally appreciated on account of its healthfulness and the smooth even texture of its meat or pulp, having no natural woody or fibrous particles such as are common in the quince, pear and peach.

Therefore, in describing my process and product, the apple is mentioned as the base-fruit from which the tasteless pulp is obtained, although the invention is not limited to the use of the apple for this purpose. For the sake of economy in saving both the time and fruit that would be lost in peeling and coring the apples, they may be cooked whole or entire, and after expressing the juice from the cooked apples, the seeds and other non-meaty substances may be separated from the pulp or meaty substance by any appropriate means, leaving only the juiceless, seedless and flavorless pulp which is used as the base or main ingredient of a large number of deliciously flavored and healthful jams, pies, etc., by adding juices of any of the above named fruits or of many others not named, or by adding flavoring extracts or compounds of any appropriate kind, further cooking being unnecessary in some instances, especially where the added fruit-juice has been cooked. A simple instance of this kind is where raspberry jam is desired, in which case the juice and meat are cooked together (in the whole berries), the cooked juice is expressed from the cooked pulp or meat, the seeds are removed from the pulp, and then the cooked juice is mixed with the cooked meat or pulp, and this jam is all right for immediate use. Of course it should be further cooked or otherwise additionally treated to preserve it for future use.

The broadest aspect of my invention is the process of obtaining the food-ingredient constituting the flavorless fruit-pulp, above described, to be used by manufacturers of fruit preserves, jams, pies, etc.; and a simple process of obtaining this ingredient consists (first) in cooking the apples (or other fruit), (second) expressing the juice from the cooked fruit, (third) thinning the juiceless mass with pure water to the consistency of apple sauce or of gruel, (fourth) passing the meaty pulp through a sieve or pulping machine to eliminate the seeds and other non-meaty parts, (fifth) separating the meaty pulp from the bulk of the water, and (sixth) heating the pulpy mass sufficiently to evaporate any surplus or excess of water and thoroughly sterilize and incorporate the remaining water with the meaty pulp.

The foregoing process is extended as follows in making jam or pie-filler: In addition to the foregoing six steps of the process, the seventh is—thin the mass of pulp with fruit-juice or with any pure mixture of water and flavoring, eighth cook the thinned mass to the desired consistency and until the ingredients are thoroughly merged with one another. These eight steps are followed only where the jam or other finished food product is made from pulp finished as in the preceding paragraph and sold for subsequent use, and the last two steps may take place many months after the first six steps if the pulp is properly preserved by the mixture of sugar therewith or by being kept airtight.

The fifth and sixth steps may be eliminated when the complete food product is to be made by steps following in immediate succession; that is, the seventh and eighth steps may be substituted for the fifth and sixth. As an additional step, fruit pectin may be added in case more pectin is desired than is contained in the selected fruit-juice or flavor.

It is recognized that, prior to this invention, fruit pulp has been employed as a base or filler for food products, and I do not claim the use of fruit-pulp broadly, but I wish to emphasize that where the juice is first expressed and the cooking of the pulp follows, the product is not tasteless or flavorless, and the apple taste remains to some extent even after the selected flavor is added; but where the cooking precedes the expressing of the juice, the pulp is flavorless and gives no suggestion of the identity of the base fruit (or apple) either before or after the selected flavor is added.

The term "fruit", as used in the claims, should be construed in its broad sense as including tomatoes, watermelons, cantaloups, pumpkins and any other fruit that is capable of being used in accordance with the principles of this invention.

What I claim as my invention is,—

1. The process of obtaining a flavorless food ingredient from fruits, consisting in cooking the fruits, expressing the juice from the previously cooked fruit, mixing the juiceless residue with liquid to form a semi-liquid mass, discarding from this mass the non-meaty portions so as to retain only the meaty pulp and liquid, then discarding a sufficient portion of the liquid to reduce the residue to an approximately solid mass.

2. The process of obtaining a food product from fruits, consisting in cooking the fruits, expressing the juice from the cooked fruits, mixing the juiceless residue with liquid to form a semi-liquid mass, discarding from this mass the non-meaty portions so as to retain only the meaty pulp and liquid, adding fruit juice to the meaty pulp and liquid, and boiling the pulp and liquid together with the added fruit juice.

CLARENCE H. SIMPSON.